(12) United States Patent
Veeser

(10) Patent No.: US 6,869,087 B2
(45) Date of Patent: Mar. 22, 2005

(54) SELF-LOADING SNOWMOBILE DOLLY

(76) Inventor: Patrick J. Veeser, E2620 Sunset Rd., Luxemburg, WI (US) 64217

( * ) Notice: Subject to any disclaimer, the term of this patent is extended or adjusted under 35 U.S.C. 154(b) by 93 days.

(21) Appl. No.: 10/385,003

(22) Filed: Mar. 10, 2003

(65) Prior Publication Data

US 2003/0173752 A1 Sep. 18, 2003

Related U.S. Application Data

(60) Provisional application No. 60/363,488, filed on Mar. 12, 2002.

(51) Int. Cl.$^7$ ............................................. B62B 1/00
(52) U.S. Cl. ................................................. 280/79.11
(58) Field of Search .................... 280/79.11, 79.2–79.7; D34/23; 180/183, 184

(56) References Cited

U.S. PATENT DOCUMENTS

| | | | |
|---|---|---|---|
| 3,658,200 A | * | 4/1972 | Chaplinski .................. 414/447 |
| 3,777,829 A | | 12/1973 | Rogers |
| 3,860,078 A | | 1/1975 | Stoick |
| 3,897,959 A | * | 8/1975 | Haffner ................... 280/79.11 |
| 4,288,087 A | | 9/1981 | Morrison |
| 5,441,378 A | | 8/1995 | Puls |
| 5,449,184 A | | 9/1995 | Knobloch |
| 5,632,498 A | | 5/1997 | Beaudet et al. |
| 5,716,061 A | | 2/1998 | Sloan et al. |
| 6,015,254 A | | 1/2000 | Keeler |
| 6,206,386 B1 | | 3/2001 | Briggs |
| 2001/0033071 A1 | * | 10/2001 | Krumwiede ................ 280/656 |

* cited by examiner

Primary Examiner—Bryan Fischmann
(74) Attorney, Agent, or Firm—Andrus, Sceales, Starke & Sawall, LLP

(57) ABSTRACT

A self-loading dolly is adapted to rest on a support surface and support a snowmobile having a pair of skis and a drive track. A track platform assembly is connected to the rear ends of frame members and is pivotally mounted relative to inwardly extending tubes on the rear ends of the framework for supporting the drive track of the snowmobile. A vertically movable spreader bar assembly joins the front ends of the frame members. The track platform assembly defines rear stabilizing structure engageable with the drive track and the support surface for preventing movement of a rear portion of the framework during loading and unloading of the snowmobile. The spreader bar assembly defines front stabilizing structure engageable with the drive track and the support surface for preventing movement of a forward portion of the framework during loading and unloading of the snowmobile.

15 Claims, 4 Drawing Sheets

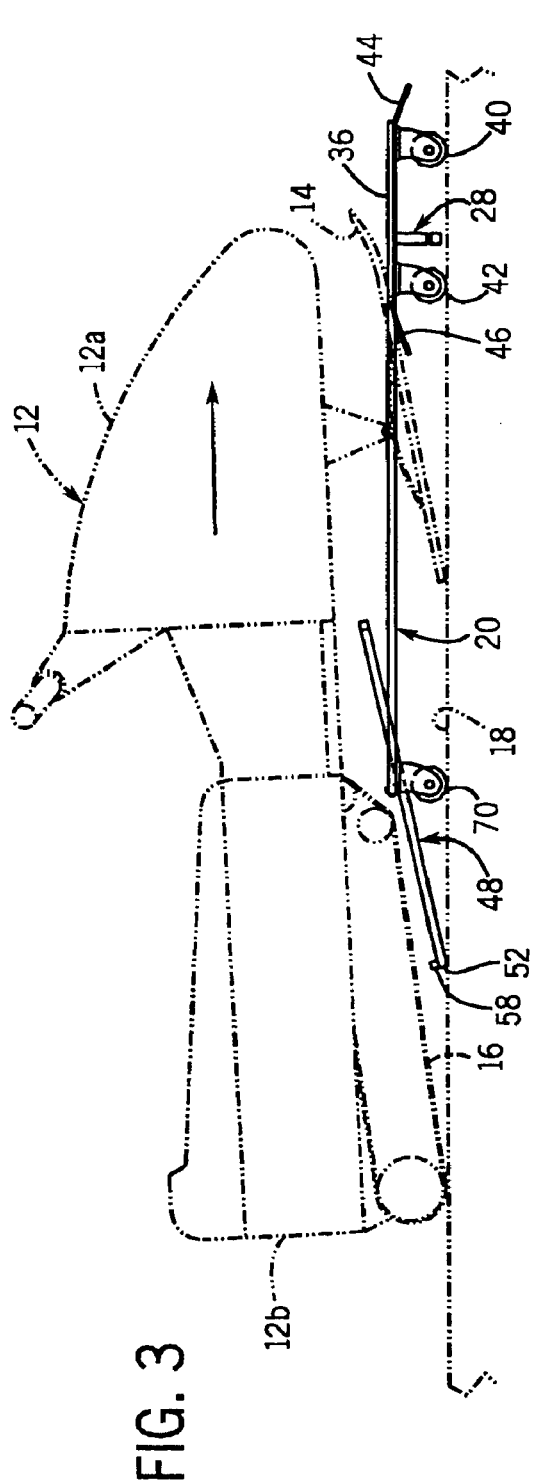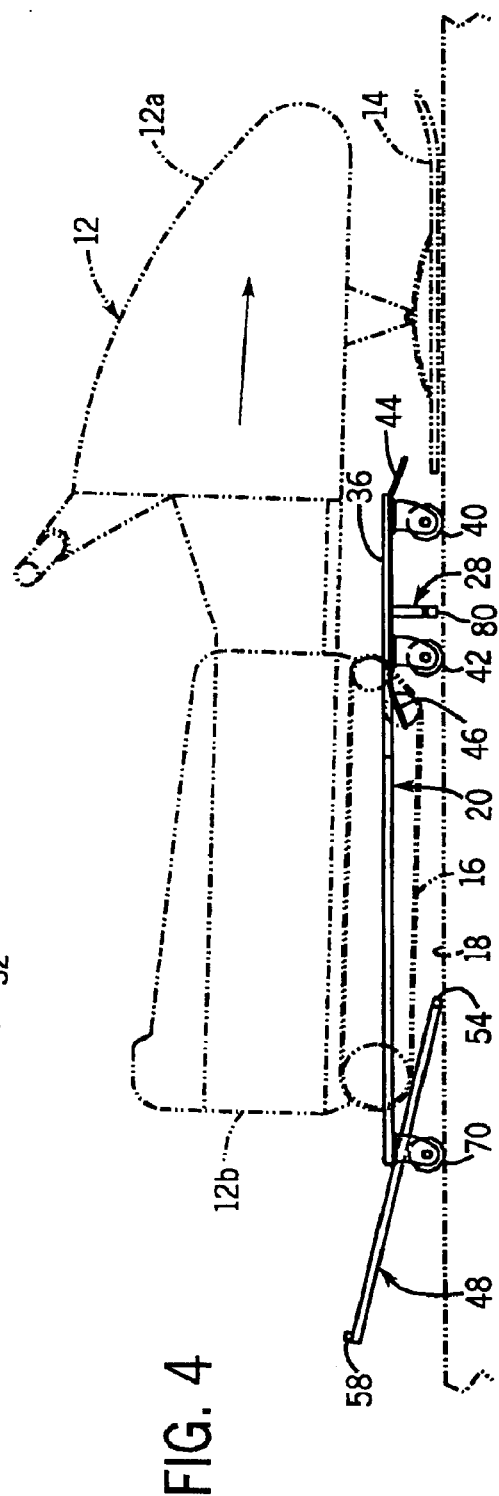

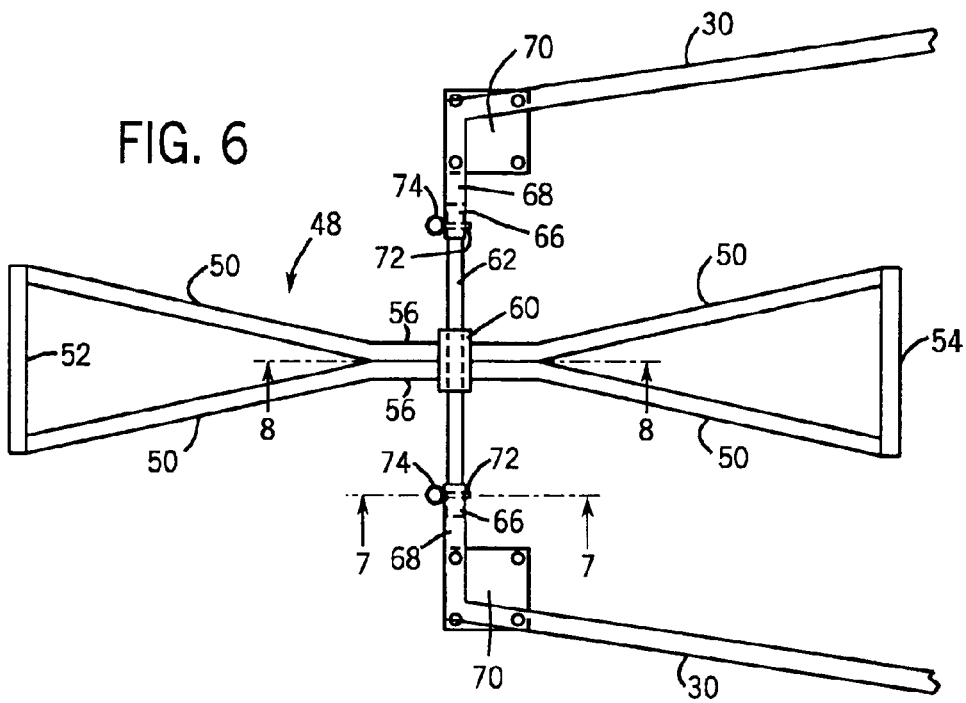
FIG. 6
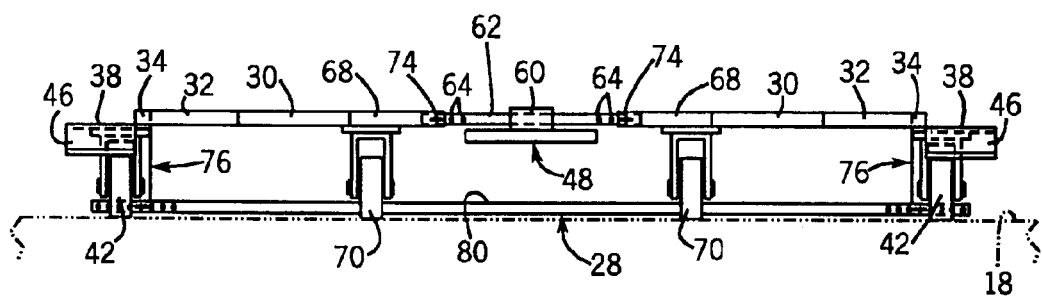
FIG. 5
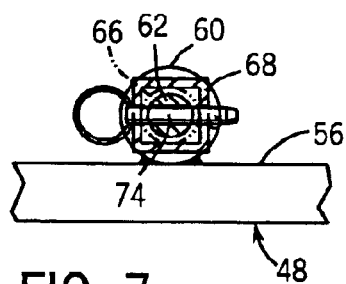
FIG. 7
FIG. 8

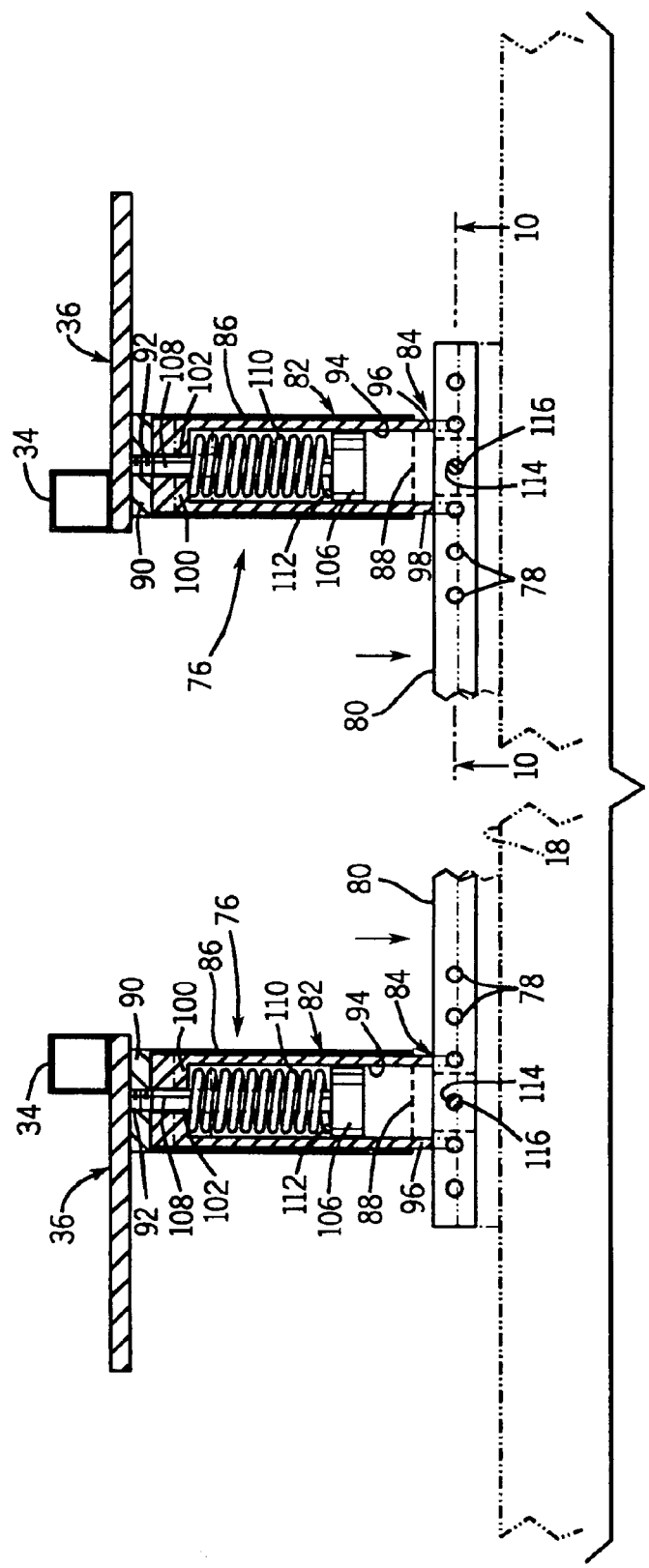
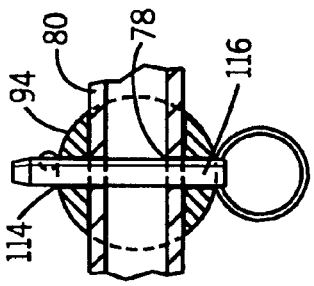
FIG. 9
FIG. 10

SELF-LOADING SNOWMOBILE DOLLY

CROSS REFERENCE TO RELATED APPLICATION

This application is based on and claims priority from Provisional U.S. Patent Application Ser. No. 60/363,488 filed Mar. 12, 2002.

FIELD OF THE INVENTION

This invention relates generally to snowmobile accessories and, more particularly, pertains to a self-loading dolly for enabling stabilized loading and unloading of a snowmobile and facilitating movement of the snowmobile upon floor surfaces.

BACKGROUND OF THE INVENTION

Snowmobiles generally include a forward body portion including a motor, a rearward seat portion on which the driver and passenger sit and which is positioned on top of a drive track member, and a pair of forward skis extending from the forward body portion. Snowmobiles, although extremely maneuverable in snow, are quite heavy and cumbersome to move about on hard surfaces such as concrete garage floors. To accommodate such movement and prevent damage to the concrete floors caused by driving the snowmobile directly onto the garage floor, dollies to make the snowmobiles more mobile and support the snowmobile above the floor level are very useful. Such dollies need to be stable and secure to prevent the snowmobile from tipping or falling off creating a risk of damage to the snowmobile or personal injury.

Prior art snowmobile dollies are disclosed in U.S. Pat. Nos. 3,777,829; 3,860,078; 4,288,087; 5,441,378; 5,449,184; 5,632,498; 5,716,016; 6,015,254; and 6,206,386. All of these devices commonly employ a framework of one or more pieces having wheels or casters for enabling movement of the loaded snowmobile. Several of these devices incorporate lifting or hoisting devices for moving the snowmobile upwardly onto the dolly itself. The '184 patent includes a mechanism by which the dolly can be frictionally inhibited from rolling on the support surface so that the snowmobile can be unloaded without that danger.

Although such prior art dollies generally perform satisfactorily for their intended purpose, it is desirable to provide a differently styled dolly which prevents driving contact of the snowmobile directly upon the garage floor and which permits stabilized loading and unloading of the snowmobile so as to provide a maneuverable support device.

SUMMARY OF THE INVENTION

It is a general object of the present invention to provide an improved dolly for supporting and transporting a snowmobile in an indoor storage facility.

It is also an object of the present invention to provide a dolly for facilitating transfer to and from an indoor storage facility in a stable and secure manner.

It is another object of the present invention to provide a dolly having a framework which provides self centering of the snowmobile during loading thereof.

It is a further object of the present invention to provide a dolly which can accommodate different sizes of snowmobiles.

It is an additional object of the present invention to provide a dolly which will preserve the condition of the floor surface in an indoor storage facility.

Still another object of the present invention is to provide a snowmobile dolly having a pivoting track platform and a movable spreader bar for maintaining the position of the dolly during loading and unloading of the snowmobile.

Yet another object of the present invention is to provide a snowmobile dolly which does not require any lifting or hoisting mechanism.

A still further object of the present invention is to provide a snowmobile dolly which is convenient and safe to use.

In one aspect of the invention, a self-loading dolly is adapted to rest on a support surface and support a snowmobile having a pair of skis and a drive track. The dolly includes a framework having spaced apart, right and left diverging frame members provided with rear ends having inwardly extending tubes, and front ends having linear segments for holding ski platforms used to support the skis. The rear ends and front ends are provided with casters for providing movement of the dolly upon the support surface. A track platform assembly is connected to the rear ends of the frame members and is pivotally connected to the inwardly extending tubes in the rear ends of the framework for supporting the drive track of the snowmobile. A vertically movable spreader bar assembly joins the front ends of the frame members. The track platform assembly defines rear stabilizing structure engageable with the drive track and the support surface for preventing movement of a rear portion of the framework during loading and unloading of the snowmobile. The spreader bar assembly defines front stabilizing structure engageable with the drive track and the support surface for preventing movement of a forward portion of the framework during unloading of the snowmobile.

The track platform assembly includes an open, tubular track platform constructed from a pair of bent side tubes and a pair of connecting end tubes to form a pair of generally triangular sections connected by a linear mid section. A cylindrical sleeve is fixed to the mid section and receives a cylindrical shaft therein, the shaft having opposed ends which are rotatably received and connected in outermost ends of the inwardly extending tubes. The spreader bar assembly includes a pair of spring-biased, plunger assemblies having upper ends fixed to bottom surfaces of the ski platforms beneath the linear segments, and lower ends removably coupled at various positions to outermost ends of a tubular spreader bar which spans the front ends of the framework.

Various other features, object and advantages of the invention will be made apparent through the following description taken together with the drawings.

BRIEF DESCRIPTION OF THE DRAWINGS

The drawings illustrate the best mode presently contemplated of carrying out the invention.

In the drawings:

FIG. 3 is a view like FIG. 2 showing in phantom lines the self-loading of a snowmobile onto the dolly;

FIG. 4 is a view like FIG. 3 showing in phantom lines the unloading of a snowmobile from the dolly;

FIG. 5 is a sectional view taken on line 5—5 of FIG. 1;

FIG. 6 is an enlarged, fragmentary plan view of the rear portion of the dolly;

FIG. 7 is a sectional view taken on line 7—7 of FIG. 6;

FIG. 8 is a sectional view like FIG. 7 but showing the tilting of the track platform, the pop-in pin being omitted;

FIG. 9 is a fragmentary, sectional view of the plunger assemblies used with the spreader bar; and FIG. 10 is a partial sectional view taken on line 10—10 of FIG. 9.

DETAILED DESCRIPTION OF THE INVENTION

Figure 1:
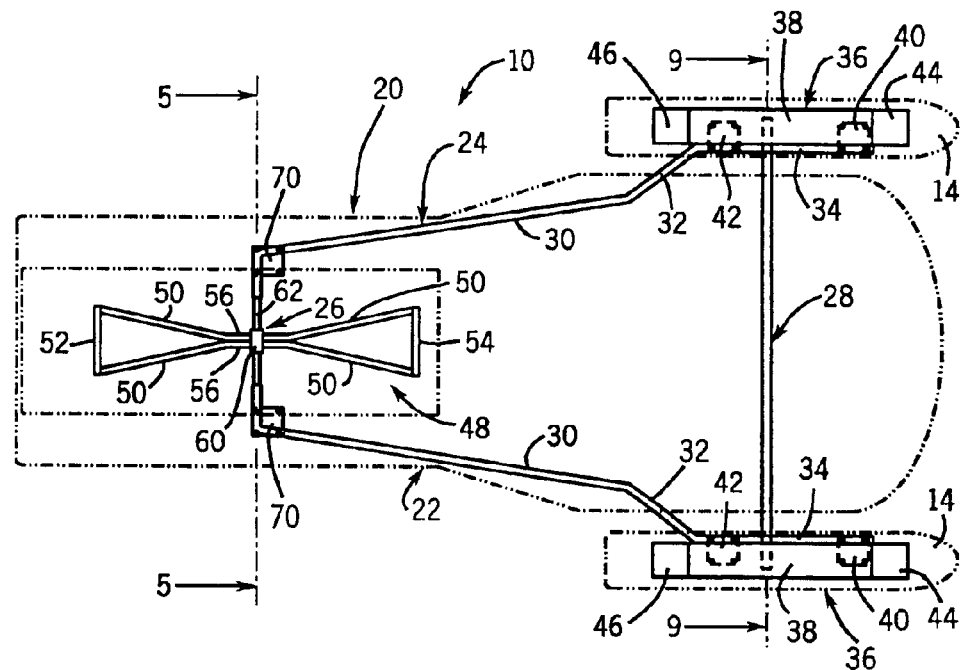
FIG. 1 is a plan view of a self-loading snowmobile dolly embodying the invention.
Figure 2:
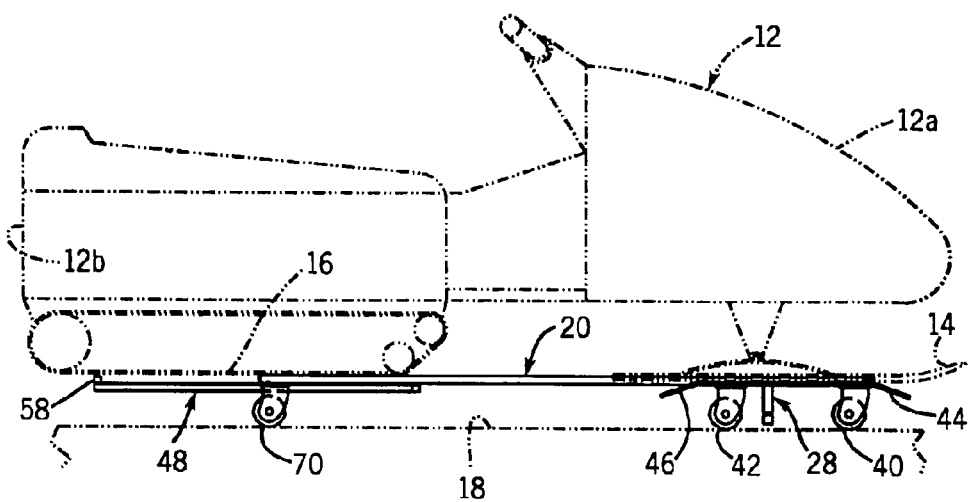
FIG. 2 is a side view of the snowmobile dolly shown in FIG. 1 showing in phantom lines a snowmobile fully loaded upon the dolly.

Referring now to the drawings, FIGS. 1 and 2 illustrate a dolly 10 constructed in accordance with the invention for movably supporting a snowmobile 12 having a front portion 12*a* with a pair of longitudinally extending skis 14 and a rear portion 12*b* with an endless ground engageable drive track 16 above a hard support surface such as a concrete floor 18.

The dolly 10 includes an open rigid framework 20 comprised of a right frame member 22, a left frame member 24, a track platform assembly 26 connecting rear ends of the frame members 22, 24, and a vertically movable spreader bar assembly 28 joining front ends of the frame members 22, 24. Each of the frame members 22, 24 has a first diverging portion 30, a second diverging portion 32 and a linear segment 34 which supports a generally rectangular, padded ski platform 36 for holding one of the snowmobile skis 14. Each ski platform 36 has a main portion 38 which extends generally parallel to the concrete floor 18 and is spaced therefrom by a pair of front and rear swivel casters 40, 42. The main portions 38 are suitably sized to support the skis 14 of the snowmobile 12. In addition, each ski platform 36 is provided with a front ramp 44 and a rear ramp 46 to facilitate smooth loading and unloading of the skis 14 as will be described below. As will also be appreciated hereafter, the second diverging portions 32 of frame members 22, 24 provide a self centering of the snowmobile 12 as it is loaded onto the dolly 10.

The track platform assembly 26 includes an open, tubular track platform 48 constructed from a pair of bent side tubes 50 and a pair of end tubes 52, 54 to form generally opposed triangular sections connected by a linear mid section 56. Track platform 48 is suitably sized so as to support the drive track 16 of the snowmobile 12. End tube 52 is provided with an upstanding gripper element 58 to provide for better engagement with the drive track 16 of the snowmobile 12. As seen best in FIGS. 5–8, a cylindrical sleeve 60 has a bottom portion welded to the mid section 56 at a top surface thereof. The sleeve 60 rotatably receives an elongated cylindrical shaft 62 having opposed ends provided with a series of horizontally-spaced, throughholes 64 (FIG. 5) formed therein. The ends of the shaft 62 are telescopically or slidably positioned within a pair of cylindrical bushings 66 welded inside the outermost ends of inwardly extending linear square tubes 68 of square cross section located at the rear ends of the frame members 22, 24. A set of casters 70 is mounted at the intersection between each square tube 68 and the rearward end of each first diverging portion 30. The square tubes 68 have at least two horizontally-spaced apertures 72 which are aligned with the throughholes 64 formed in the ends of the shaft 62. Two pop-in pins 74 are passed through the aligned through holes 64 and apertures 72 to lock the square tubes 68 relative to the shaft 62. With this feature, the distance of at the rear of the frame members 22, 24 may be adjusted to accommodate the size of the snowmobile 12. The pop-in pins 74 preferably are those of the conventional type having a spring-loaded ball at one end to prevent the pin from backing out of the aligned openings.

Besides connecting the rear ends of the frame members 22, 24, the above described structure also permits the track platform 48 to pivot relative to the shaft 62 and inwardly extending square tubes 68. The track platform 48 is positioned below the sleeve 60 so that it may pivot in one direction (FIGS. 3 and 8) during loading of the snowmobile 12, and in another direction (FIG. 4) during unloading of the snowmobile 12. It will be appreciated hereafter that the track platform 48 provides rear stability during loading and unloading of the snowmobile 12.

With reference to FIGS. 5, 9 and 10, the spreader bar assembly 28 includes a pair of spaced apart, spring-biased, plunger assemblies 76 having upper ends fixed, such as by welding, to the bottom surfaces of the ski platforms 36 beneath the linear segments 34. Lower ends of the plunger assemblies 76 are removably connected to selected openings 78 formed through outer ends of the square-tubed, spreader bar 80 which spans the front ends of the framework 20. The plunger assembly 76 allows limited upward and downward, vertical motion of the spreader bar 80 relative to the floor 18.

Each plunger assembly 76 is constructed of an outer shell 82 and an inner tubular arrangement 84. The outer shell 82 has a generally cylindrical sidewall 86, an open bottom 88 and a top wall 90 formed with a threaded hole 92 throughout its thickness. The inner tubular arrangement 84 is defined by an inner tube 94 having a cylindrical side wall 96, an open bottom 98, and a top wall 100 provided with a clearance hole 102 forming a passageway. The interior of the tube 94 receives a shoulder bolt 106 having a shaft 108 which passes through the center of a coil spring 110. The end of the bolt 106 passes through and beyond the clearance hole 102 and is designed to be screwed into the threaded hole 92 in the top wall 90 of the outer shell 82. One end of the spring 110 is held against the underside of the shoulder bolt at 112. The other end of the spring 10 is held against the inside of the top wall 100 of the tube 94. The lower end of the tube 94 has a recess 114 aligned with one of the openings 78 in the spreader bar 80. A pop-in pin 116, similar to that previously described, locks the spreader bar 80 together with the inner tubular arrangement 84. This structure enables the distance between the ski platforms 36 to be varied to adjust for the size of the snowmobile 12. The spring-biased, plunger assemblies 76 are normally biased to hold the spreader bar 80 about one inch above the floor 18 at the front end of the dolly 10. As will be understood, the top of the spreader bar 80 is engaged by the drive track 16 of the snowmobile 12 during unloading thereof to provide forward stability to the dolly 10.

To load the dolly 10, the snowmobile 12 is driven forwardly of the framework 20 (in the direction of the arrow in FIG. 3) such that the drive track 16 moves up the track platform 48. As is known, the drive track 16 is designed to move upwardly due to an arrangement (not shown) in the rear portion 12*b* of the snowmobile. As the snowmobile 12 moves forward, the track platform 48 tilts towards a horizontal position and the skis 14 lie upon the floor 18 with their front ends on the rear ramps 46. During this initial movement, it can be seen that the rear edge 52 of the track platform 48 is forcefully engaged against a concrete floor 18 so as to stabilize the rear portion of framework 20 upon its casters 40, 42, 70. Continuing motion of the drive track 16 will tend to tilt the track platform 48 towards the horizontal position and will cause the skis 14 to ride up the ski platforms 36. It is important to note that if the snowmobile driver is slightly askew in ascending the dolly 10, the second diverging portions 32 of the framework 20 will self center the snowmobile 12 so that the skis 14 will be ultimately located on the ski platforms 36. As soon as the skis 14 are positioned on the ski platforms 36 and the drive track 16 has pivoted a track platform 48 to horizontal, the snowmobile motor is shut off and the snowmobile 12 is fully supported on the dolly 10 (FIG. 2). In this position, the casters 40, 42, 70 are free to roll and the snowmobile 12 supported on the dolly 10 can be moved freely and without any damage about the concrete floor 18.

To unload the snowmobile 12, the dolly 10 is rolled such that the front of the snowmobile 12 is oriented out of the garage or storage facility. The snowmobile driver then moves forwardly (in the direction of the arrow in FIG. 4) so that the skis 14 will move down the front ramps 44 of the ski platforms 36 and out onto a snow surface beyond the concrete floor 18. At the same time, the drive track 16 pivots the track platform 48 downwardly so that its front edge 54 will be tightly held against the floor 18 so as to stabilize the rear of the framework 20. The rear edge 52 and the front edge 54 of track platform 48 thus define rear stabilizing structure engageable with the drive track 16 and the supporting surface 18 for preventing movement of the rear portion of the framework 20 during loading and unloading of the dolly. As the drive track 16 moves forward, it runs over the top surface of the spreader bar 80 forcing the bottom surface of the spreader bar 80 against the floor 18, and further stabilizes the front of the dolly 10 to provide a smooth and safe dismount of the snowmobile 12. During this movement, the springs 110 of plunger assemblies 76 are compressed as the inner tubular arrangements 84 move downwardly relative to the fixed outer shells 82. Once the drive track 16 has cleared the spreader bar 80, the springs 110 will return the spreader bar 80 to its normal position spaced just above the floor 18.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth in the following claims.

I claim:

1. A self-loading dolly adapted to rest on a support surface and support a snowmobile having a pair of skis and a drive track, the dolly comprising:

a framework having spaced apart, right and left diverging frame members provided with rear ends having inwardly extending tubes, and front ends having linear segments for holding ski platforms used to support the skis thereon, the rear ends and the front ends being provided with casters for providing movement of the dolly upon the support surface;

a track platform assembly connected to the rear ends of the frame members and being pivotally mounted relative to the inwardly extending tubes on the rear ends of the framework for supporting the drive track of the snowmobile; and a vertically movable spreader bar assembly joining the front ends of the frame members, the track platform assembly defining rear stabilizing structure engageable with the drive track and the support surface for preventing movement of a rear portion of the framework during loading and unloading of the snowmobile, and the spreader bar assembly defining front stabilizing structure engageable with the drive track and the support surface for preventing movement of a forward portion of the framework during unloading of the snowmobile.

2. The self-loading dolly of claim 1, wherein the right and left diverging frame members having first portions diverging outwardly from the inwardly extending tubes, and second portions diverging outwardly from the first portions, the second portions being connected with the linear segments at the front ends of the framework.

3. The self-loading dolly of claim 2, wherein the second diverging portions form guide structure for self centering the snowmobile on the dolly.

4. The self-loading dolly of claim 1, wherein the ski platforms are provided with front and rear ramps to facilitate loading and unloading of the snowmobile relative to the dolly.

5. The self-loading dolly of claim 1, wherein the framework includes adjustment structure for enabling variation in the distance between the frame members at the rear and front ends thereof.

6. The self-loading dolly of claim 1, wherein the casters are located on front and rear ends of the ski platforms, and the rear ends of the diverging frame members.

7. The self-loading dolly of claim 1, wherein the track platform assembly includes an open, tubular track platform constructed from a pair of bent side tubes and a pair of connecting end tubes to form a pair of generally triangular sections connected by a linear mid section.

8. The self-loading dolly of claim 7, wherein the track platform has a rear edge engageable with the support surface upon loading of the snowmobile, and a front edge engageable with the support surface upon unloading of the snowmobile.

9. The self-loading dolly of claim 7, wherein the track platform is movable to a substantially horizontal position lying beneath the frame members for supporting the drive track of the snowmobile.

10. The self-loading dolly of claim 7, wherein a cylindrical sleeve is fixed to the mid section and receives a cylindrical shaft therein, the shaft having opposed ends which are rotatably received in outermost ends of the inwardly extending tubes.

11. The self-loading dolly of claim 10 wherein the cylindrical shaft and the inwardly extending tubes have aligned openings, and retainers are passed through the aligned openings to connect the cylindrical shaft with the inwardly extending tubes at various positions.

12. The self-loading dolly of claim 10, wherein the track platform is pivotally mounted relative to the cylindrical shaft.

13. The self-loading dolly of claim 1, wherein the spreader bar assembly includes a pair of spring-biased, plunger assemblies having upper ends fixed to bottom surfaces of the ski platforms beneath the linear segments, and lower ends removably coupled at various points to outermost ends of a tubular spreader bar which spans the front ends of the framework.

14. The self-loading dolly of claim 13, wherein the plunger assemblies allow limited vertical movement of the spreader bar relative to the support surface.

15. The self-loading dolly of claim 13, wherein the spreader bar has a top surface engageable with the drive track of the snowmobile and a bottom surface engageable with the support surface upon unloading of the snowmobile.

* * * * *